Jan. 8, 1963
L. R. HETZLER ET AL
3,072,838
MAGNETIC AMPLIFIER SYSTEM
Filed April 8, 1960
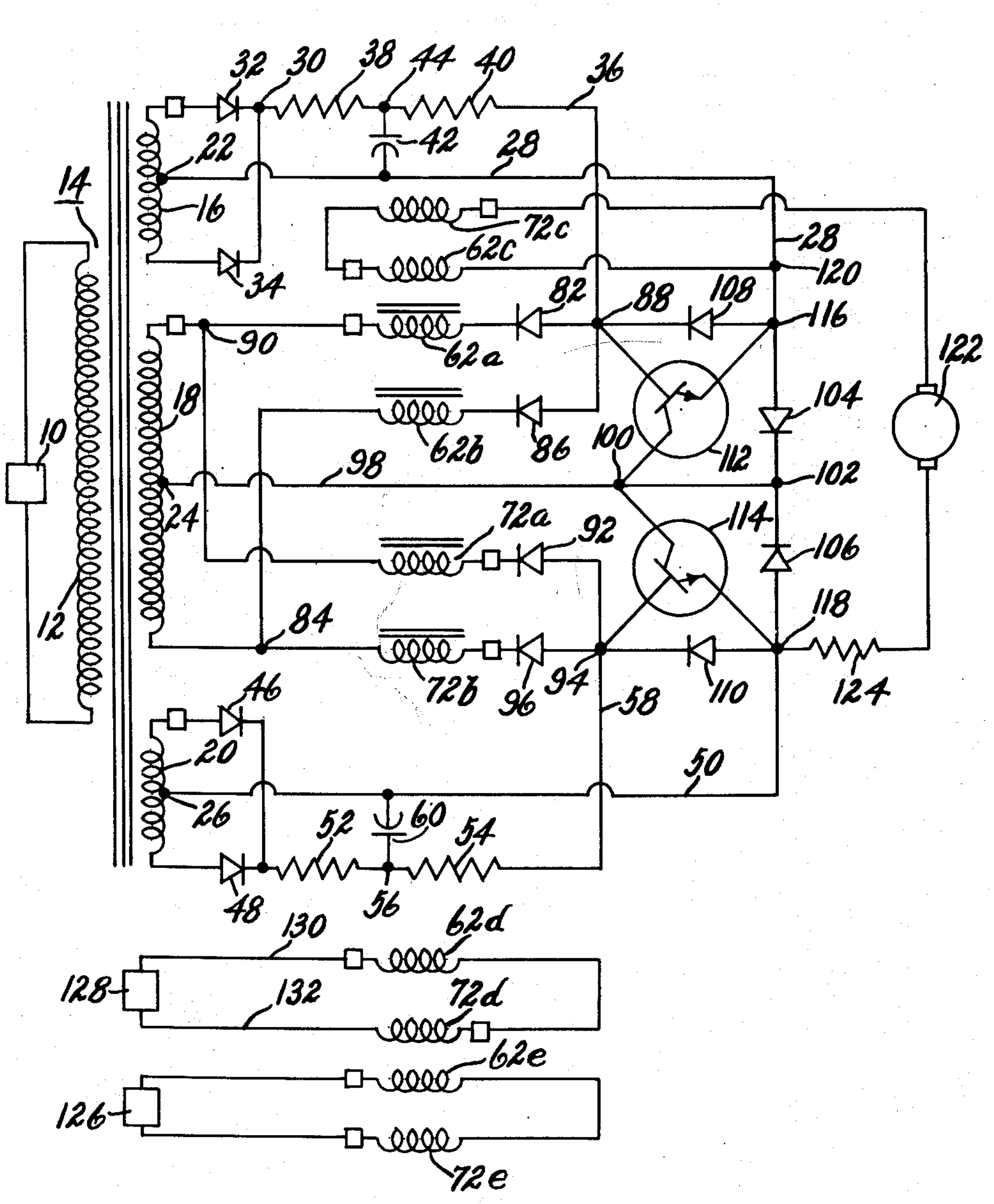
INVENTORS
LEWIS R. HETZLER
DAVID J. HARTMAN
GERALD O. HUNTZINGER
BY C. R. Meland
THEIR ATTORNEY 3,072,838
Patented Jan. 8, 1963

3,072,838

MAGNETIC AMPLIFIER SYSTEM

Lewis R. Hetzler, David J. Hartman, and Gerald O. Huntzinger, Anderson, Ind., assignors to General Motors Corporation, Detroit, Mich., a corporation of Delaware Filed Apr. 8, 1960, Ser. No. 20,847
7 Claims. (Cl. 321—25)

This invention relates to magnetic amplifiers, and more particularly to a magnetic amplifier system having a polarity reversible D.C. output signal.

One of the objects of this invention is to provide a control system that includes means for providing a full wave direct current output signal that is controlled both as to magnitude and polarity by a magnetic amplifier arrangement.

A further object of this invention is to provide a control system that includes full wave rectifier means for converting an A.C. voltage to direct current and a magnetic amplifier for controlling the magnitude and polarity of the D.C. output voltage of the system.

Still another object of this invention is to provide a control system that includes a center tapped transformer that is supplied with A.C. voltage and which supplies a two-lead D.C. circuit through rectifier and magnetic reactor means, and further wherein transistor switching means are provided forming a return current path to the center tap of the transformer.

Another object of this invention is to provide a system of the type described above wherein the transistor switching means is normally biased to a conductive state by separate bias supplies.

Further objects and advantages of the present invention will be apparent from the following description, reference being had to the accompanying drawing, wherein a preferred embodiment of the present invention is clearly shown.

In the drawing:

The single FIGURE drawing is a schematic circuit diagram of a control system made in accordance with this invention.

Referring now to the single figure drawing, the reference numeral 10 designates a source of A.C. voltage which may be, for example, 5000 cycle per second square wave power. The source of A.C. voltage 10 is connected with the primary winding 12 of a transformer designated in its entirety by reference numeral 14. The transformer has secondary windings 16, 18 and 20 which are center tapped at 22, 24 and 26. The center tap 22 is connected with a lead wire 28 and it is seen that the secondary winding 16 is connected with a junction 30 through rectifiers 32 and 34. The junction 30 is connected with a lead wire 36 through resistors 38 and 40. A condenser 42 is connected between the junction 44 and the lead wire 28.

In a similar fashion, the winding 26 is connected with rectifiers 46 and 48 while the center tap 26 is connected with lead wire 50. Resistors 52 and 54 are provided connected with the junction 56 and lead wire 58. A condenser 60 is connected between the junction point of resistors 52 and 54 and the lead wire 50 as is clearly apparent from the drawing.

The present system includes a pair of magnetic amplifiers. One of these magnetic amplifiers includes the load windings or reactors 62*a* and 62*b* which are magnetically coupled with coil windings 62*c*, 62*d* and 62*e* by winding them on the same magnetic core which is formed of magnetic material having a rectangular hysteresis loop. The other magnetic amplifier includes load or reactor windings 72*a* and 72*b* which are magnetically coupled with coil windings or control windings 72*c*, 72*d* and 72*e*. It is to be understood that the current flow through control windings 62*c*, 62*d* and 62*e* controls the saturation of the cores upon which the reactor windings 62*a* and 62*b* are wound. On the other hand, the current flow through control windings 72*c*, 72*d* and 72*e* controls the saturation of the cores on which the reactor windings 72*a* and 72*b* are wound.

It is seen that the reactor winding 62*a* is connected to one side of transformer winding 18 and is connected with a rectifier 82. The reactor winding 62*b* is connected between a junction 84 and rectifier 86. The rectifier 86 is connected with junction 88 as is clearly apparent from the drawing. The reactor winding 72*a* is connected between junction 90 and the rectifier 92. The opposite side of the rectifier 92 is connected with junction 94. The reactor winding 72*b* is connected between junction 84 and the rectifier 96 as is clearly apparent from the single figure drawing.

The center tap 24 of transformer winding 18 is connected with a lead wire 98 which in turn is connected with junction 100. The junction 100 is also connected with junction 102 which is connetced with rectifiers 104 and 106. The rectifier 104 is connected with lead wire 28 whereas the rectifier 106 is connected with lead wire 50. A rectifier 108 is connected between lead wire 28 and junction 88 and a rectifier 110 is connected between lead wire 50 and the junction 94.

The control system of this invention includes a pair of NPN transistors 112 and 114. It is seen that the base electrode of transistor 112 is connected with junction 88 whereas the base electrode of transistor 114 is connected with junction 94. The collector electrodes of transistors 112 and 114 are both connected with junction 100. The emitter electrode of transistor 112 is connected with junction 116 whereas the emitter electrode of transistor 114 is connected with junction 118. The coil windings 62*c* and 72*c* are connected in series and are connected between junction 120 and the electrical load of the system which in this case is a torque motor designated by reference numeral 122. The opposite side of the load 122 is connected with resistor 124 and it is seen that this resistor is connected with the junction 118.

The coil windings 62*e* and 72*e* are bias coil windings for the reactor windings and are connected with a suitable source of bias voltage designated by reference numeral 126. The windings 62*d* and 72*d* are control windings and are connected in series with a source of control voltage designated by reference numeral 128. The voltage source 128 has a variable output and has the ability to change the polarity of lead wires 130 and 132 relative to one another. In other words, the source 128 at times will cause the lead wire 130 to be positive relative to lead wire 132 and at other times will cause the lead wire 132 to be positive relative to the lead wire 130. As will be more fully described hereinafter, the magnitude and polarity of the voltage source 128 controls the magnitude and polarity of the voltage appearing across the load 122. The coil windings 62*c* and 72*c* are current feedback windings and it is seen that they are connected between the junction 120 and the load 122.

In the operation of this circuit, the rectifiers 82 and 86 form a full wave rectifier arrangement whereas the rectifiers 92 and 96 form a second full wave rectifier arrangement. Thus, in the case of rectifiers 82 and 86 and during a first half cycle of applied voltage a circuit may be traced from junction 24 through lead wire 98 through the collector and emitter circuit of transistor 114, through resistor 124, through the load 122, through coil windings 62*c* and 72*c* to junction 120, through rectifier 108, through rectifier 86 and thence through the reactor winding 62*b* to junction 84. On the other half cycle of applied voltage, the current flow can be traced from center tap 24, through lead wire 98, through the collector and emitter circuit of transistor 114, through resistor 124, through load 122, through the feed back windings 62*c* and 72*c*, through junction 120, through rectifier 108, through rectifier 82 and thence through reactor winding 62*a* to junction 90. It will be apparent to those skilled in the art that similar current paths may be traced for the circuits including the rectifiers 92 and 96 and the reactor windings 72*a* and 72*b*.

In the biasing scheme of this invention, the bias voltage 126 is set so that the reactor windings of both magnetic amplifiers conduct at approximately the mid-point of each half cycle of input power when no control signal is present. Thus, when neither magnetic amplifier is conducting, no load current flows. The current flow through control windings 62*d* and 72*d* aids the bias winding in one of the magnetic amplifiers and opposes the bias winding in the other magnetic amplifier since the control windings 62*d* and 72*d* are poled such that with a given current flow therethrough one of the windings produces a flux that is additive to the flux produced by the bias windings 62*e* and 72*e* whereas the other winding produces a flux that opposes the flux generated by the bias windings 62*e* and 72*e*. It thus can be seen that one of the magnetic amplifiers will fire earlier in the cycle than the other and this condition can be reversed by reversing the polarity of the voltage applied across lead wires 130 and 132.

It is seen from the drawing that the rectifiers 32 and 34 supply full wave direct current for biasing the transistor 112 normally to its fully conductive state. In a like manner, the rectifiers 46 and 48 supply biasing voltage to the transistor 114 to normally bias it to its fully conductive state. It will be appreciated that the emitter to collector circuits of the transistors 112 and 114 form return current paths to the center tap 24 via the lead wire 98.

Assuming now that there is a control voltage being applied across lead wires 130 and 132, one of the magnetic amplifiers, for example, the one including reactor windings 62*a* and 62*b* will fire earlier in the cycle than the magnetic amplifier including the reactor windings 72*a* and 72*b*. This will cause a D.C. voltage to appear across the load 122 with a negative polarity at junction 116. The direction of load current flow is then such as to cause diode 108 to conduct. The forward voltage drop developed across diode 108 by the load current will have the proper polarity to cut off transistor 112 which is not needed as a return current path. On the other hand, when the polarity of the source 128 is now reversed, the magnetic amplifier which previously fired first, will now fire second and the polarity of the voltage appearing across the load 122 will be reversed. In addition, because of the reversed direction of load current, diode 110 will conduct causing transistor 114 which is not needed as a return current path, to be cut off. Thus the polarity and average magnitude of the voltage appearing across the load 122 is a function of the polarity and magnitude of the voltage being applied to lead wires 130 and 132.

In the embodiment illustrated, the load 122 is a motor and is therefore highly inductive. In such situations when no current is being supplied by the magnetic amplifiers, high voltages are induced across the transistors and the current ripple in the load is excessive. The rectifiers 104 and 106 in conjunction with the switching transistors provide a path for the load current to flow regardless of which polarity of induced voltage is present. Thus, the circuit is protected against damaging voltage transients and the load current is effectively smoothed by its own inductance.

In summary, it can be seen that when neither magnetic amplifier element is conducting no load current flows and when both are conducting, the return paths through the transistors are open and again no load current flows. An input signal applied to leads 130 and 132 causes one magnetic amplifier element to conduct sooner and the other to conduct later. In this interval, when only one amplifier element is conducting, a load current is developed with polarity and average magnitude depending upon the polarity and magnitude of the control signal from source 128.

While the embodiments of the invention as herein disclosed constitute a preferred form, it is to be understood that other forms might be adopted.

What is claimed is as follows:

1. An electric circuit for providing a direct current voltage which is controllable both as to polarity and magnitude, comprising, a source of A.C. voltage including a coil winding having a center tap, first and second magnetic amplifier means, first and second full wave rectifier means, a two terminal direct current circuit, means connecting said first magnetic amplifier means and said first rectifier means between said coil winding and one of said D.C. terminals, means connecting said second magnetic amplifier means and said second rectifier means between said coil winding and the other D.C. terminal, first and second semi-conductor means connected respectively between said terminals and said center tap, and a pair of diodes having one end connected with said terminals and having their other ends connected with a common junction that is connected with said center tap.

2. An electric circuit for providing a direct current voltage which is controllable both as to polarity and magnitude comprising, a source of A.C. voltage including a coil winding having a center tap, first and second magnetic amplifier means, first and second full wave rectifier means, first and second transistors, a direct current load, a first energizing circuit for said direct current load including said coil winding, said first magnetic amplifier means, said first rectifier means and the emitter-collector circuit of said first transistor, a second energizing circuit for said direct current load including said coil winding, said second magnetic amplifier means, said second rectifier means and the emitter-collector circuit of said second transistor, said transistors having their emitter-collector circuits connected between said center tap and opposite sides of said direct current load, a first diode connecting the emitter and base electrodes of said first transistor and connected in series with said second magnetic amplifier means, a second diode connecting the emitter and base electrodes of said second transistor and connected in series with said first magnetic amplifier means, and control winding means for said magnetic amplifier means connected with a source of voltage having a reversible polarity and variable magnitude.

3. An electric circuit for providing a direct current voltage to a load which is controllable both as to magnitude and polarity comprising, a source of A.C. voltage including a transformer winding having a center tap, a direct current load, a first energizing circuit for said direct current load including said center tap, first magnetic amplifier means, first full wave rectifier means, and first semi-conductor means, a second energizing circuit for said direct current load including said center tap, second magnetic amplifier means, second full wave rectifier means and second semi-conductor means, bias voltage supply means separate from said rectifier means normally biasing said semi-conductor means to their fully conductive states, first voltage developing means connected across two terminals of said first semi-conductor means and in series with said second magnetic amplifier means for switching said first semi-conductor means off when current flows through said first voltage developing means, second voltage developing means connected across two terminals of said second semi-conductor means and in series with said first magnetic amplifier means for switching said second semi-conductor means off when current flows through said second voltage developing means, control winding means for said magnetic amplifier means, and a source of control voltage connected with said control winding means having a variable magnitude and reversible polarity.

4. A control circuit for providing a direct current voltage which is controllable both as to polarity and magnitude comprising, a source of A.C. voltage, a two terminal direct current load circuit, a transformer having a primary winding connected with said source of voltage and having a secondary winding provided with a center tap, first magnetic amplifier means including a first pair of reactor coils having ends thereof connected respectively with opposite ends of said secondary winding, rectifier means connected between the opposite ends of said first reactor coils and one of said direct current terminals, a second magnetic amplifier including a second pair of reactor coils having ends thereof connected respectively with opposite ends of said secondary winding, second rectifier means connected between the opposite ends of said second reactor coils and said second direct current terminal, semiconductor means connected respectively between the center tap of said transformer and said two direct current terminals, control winding means for first and second magnetic amplifier means, a source of control voltage connected with said control winding means which is variable in magnitude and reversible in polarity, second control winding means for said first and second reactor means, and means connecting said second control winding means in series with said load circuit.

5. In an electric circuit for providing a direct current output voltage which is controllable both as to magnitude and polarity comprising, a source of AC voltage, a transformer having a primary winding connected with said source of voltage and a secondary winding that has a center tap, a direct current load, a first circuit for energizing said direct current load including first magnetic reactor means, first rectifier means and first semi-conductor means connected with said center tap, a second energizing circuit for said direct current load including second magnetic reactor means, second rectifier means and second semi-conductor means connected with said center tap, control winding means for controlling the conduction of said magnetic reactor means connected with a source of voltage which is variable as to magnitude and reversible as to polarity, first and second bias voltage means separate from said first and second rectifier means for biasing said semi-conductor means to a normally conductive state energized from said transformer, said semi-conductor means being connected with said direct current load whereby at least one of said transistors is cut off when the voltage appearing across said load has a predetermined polarity.

6. An electric circuit for providing a direct current voltage which is controllable both as to magnitude and polarity comprising, a source of A.C. voltage, a transformer having a primary winding connected with said source of voltage and having a tapped secondary winding, said transformer having third and fourth output windings, a direct current load, a first circuit for energizing said direct current load including first full wave rectifier means, first magnetic reactor means, the emitter-collector circuit of a first transistor and a common lead wire connected with the tap point on said secondary winding, a second circuit for energizing said direct current load including second full wave rectifier means, second magnetic reactor means, the emitter- collector circuit of a second transistor and said common lead wire, third rectifier means connected between said third transformer output winding and said first transistor for applying a bias voltage across the emitter-base circuit of said first transistor to render it normally conductive in its emitter-collector circuit, fourth rectifier means connected between said fourth transformer transformer output winding and said second transistor for applying a bias voltage across the emitter-base circuit of said second transistor to render it normally conductive in its emitter-collector circuit, a first diode connected across the emitter and base electrodes of said first transistor and in series with said second magnetic reactor means, a second diode connected across the emitter and base electrodes of said second transistor and in series with said first magnetic reactor means, and control means for controlling said reactor means.

7. An electric circuit for providing a direct current voltage which is controllable both as to magnitude and polarity comprising, a source of A.C. voltage, a direct current load, a first circuit for energizing said direct current load from said source of A.C. voltage including first full wave rectifier means, first magnetic reactor means, the emitter-collector circuit of a first transistor and a common lead wire connected with said voltage source, a second circuit for energizing said direct current load including second full wave rectifier means, second magnetic reactor means, the emitter-collector circuit of a second transistor and said common lead wire, means for normally biasing both of said transistors to a conductive stated in their emitter-collector circuits energized from said voltage source, a first diode connected across the emitter and base electrodes of said first transistor and in series with said second magnetic reactor means, a second diode connected across the emitter and base electrodes of said second transistor and in series with said first magnetic reactor means, and control means for controlling said reactor means.

References Cited in the file of this patent

UNITED STATES PATENTS 2,798,904 Alexanderson ____________ July 9, 1957